United States Patent [19]

King et al.

[11] 4,355,339
[45] Oct. 19, 1982

[54] TRANSDUCER CARRIAGE ASSEMBLY

[75] Inventors: Francis K. King, San Jose, Calif.; Donald J. Wanek, Rochester, Minn.

[73] Assignee: International Business Machines Corporation, Armonk, N.Y.

[21] Appl. No.: 110,728

[22] Filed: Jan. 9, 1980

Related U.S. Application Data

[63] Continuation-in-part of Ser. No. 974,480, Dec. 29, 1978, abandoned.

[51] Int. Cl.³ .............................................. G11B 5/58
[52] U.S. Cl. .............................. 360/105; 360/130.31; 360/99
[58] Field of Search ...................... 360/105, 102–104, 360/97–99, 122, 133, 135

[56] References Cited

U.S. PATENT DOCUMENTS

| | | | |
|---|---|---|---|
| 3,702,997 | 11/1972 | Jamieson | 360/103 X |
| 3,774,183 | 11/1973 | Roscamp | 360/103 |
| 3,896,495 | 7/1975 | Beecroft | 360/103 |
| 4,089,029 | 5/1978 | Castrodale et al. | 360/105 X |
| 4,151,573 | 4/1979 | Tandon et al. | 360/104 |
| 4,167,766 | 9/1979 | Chau | 360/105 |
| 4,204,235 | 5/1980 | Stollorz | 360/105 X |

OTHER PUBLICATIONS

IBM/TDB vol. 18, No. 7, Dec. 1975, pp. 2246–2247, "Read/Write Head Load–Unload Device", by Bailey et al.

*Primary Examiner*—John H. Wolff
*Attorney, Agent, or Firm*—Robert W. Lahtinen

[57] ABSTRACT

A carriage assembly for holding a pair of opposite transducers in contact with the opposite sides of a flexible disk including an arm carrying each of the transducers. A nominally flat leaf spring has the three-fold function of (1) providing a yielding connection between the two arms so that the two arms and therefore the transducers may be swung apart about this connection, (2) yieldingly holding the arms together at their places of closest approachment at which the transducers are in contact with the opposite faces of the disk and (3) providing a yielding connection between a carriage support and the arms as an assembly when in their closest approachment so that the arms and therefore the transducers may pivot with respect to the carriage with undulations out of plane of the disk. The transducers are each carried with respect to one of the arms by means of a normally flat gimbal spring which flexes to hold the transducers in proper pressure contact with the disk.

2 Claims, 6 Drawing Figures

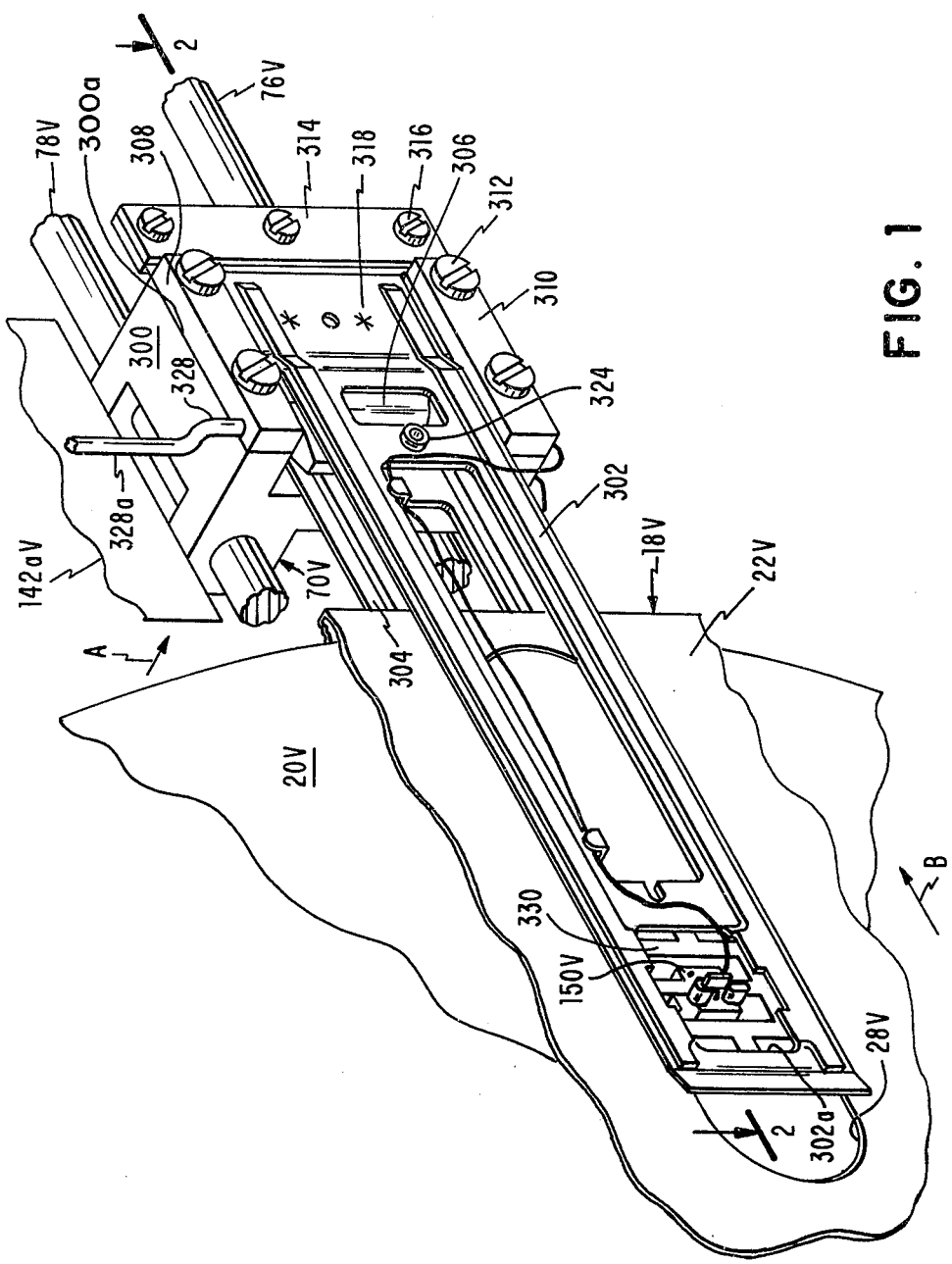

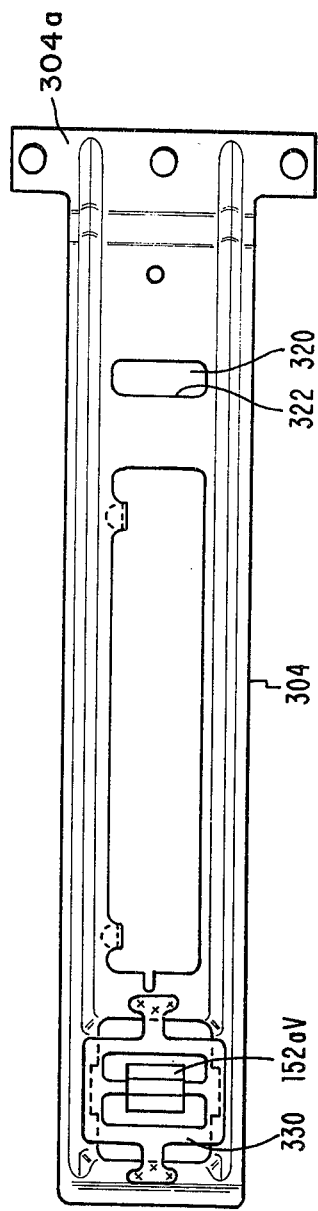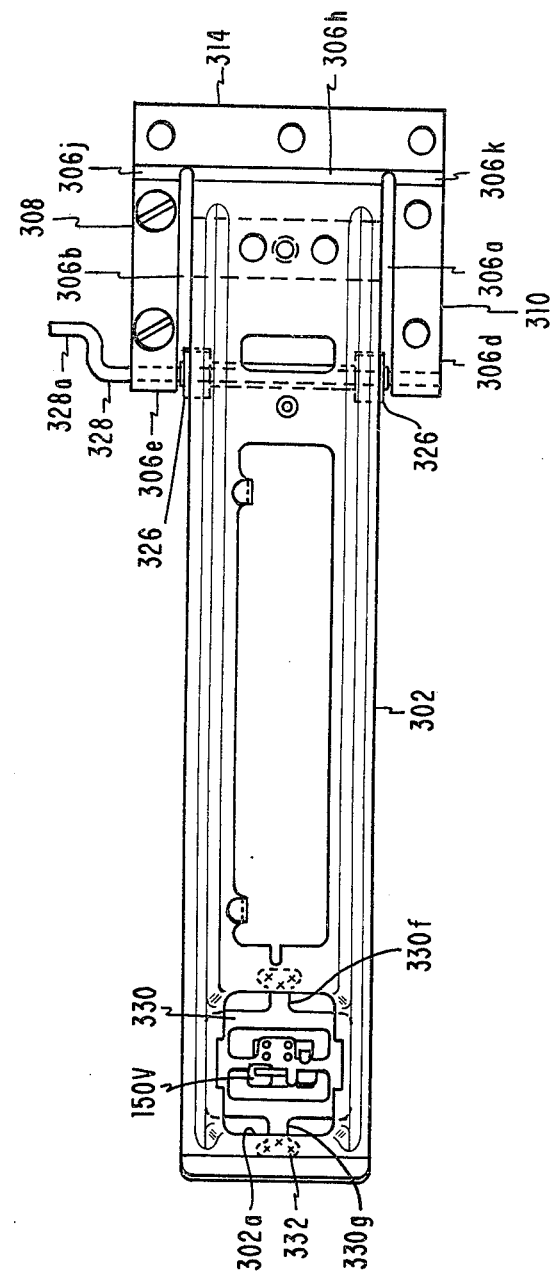
FIG. 4
FIG. 3

TRANSDUCER CARRIAGE ASSEMBLY

This application constitutes a continuation in part of our co-pending application, Ser. No. 974,480, filed Dec. 29, 1978 for Transducer Carriage Assembly and now abandoned.

CROSS REFERENCES TO RELATED APPLICATIONS

This application is related to the co-pending application of F. K. King et al, Ser. No. 974,633 filed Dec. 29, 1978 and now U.S. Pat. No. 4,191,980 for Transducers With Tapered Edge Profiles and Assembly Thereof.

BACKGROUND OF THE INVENTION

The invention relates to thin flexible magnetic disks and more particularly to carriage assemblies for holding magnetic transducers in contact with such a disk for data transfer.

It has been previously proposed in Castrodale et al U.S. Pat. No. 4,089,029, issued May 9, 1978, to provide a carriage assembly for a pair of transducers effective on a flexible magnetic disk which carriage assembly includes a gimbal spring for supporting each of the two transducers, a load arm effective on each of the transducers for moving the transducer in pressure contact with the disk and a swing arm for mounting both the gimbal spring and the load arm for each of the transducers.

SUMMARY OF THE INVENTION

It is an object of the present invention to provide an improved carriage assembly for a pair of transducers effective on the opposite sides of a thin flexible magnetic disk which is simplified with respect to prior transducer carriage assemblies.

More particularly, it is an object of the present invention to provide an improved transducer carriage assembly including a pair of swing arms each for carrying one of two opposite transducers to be effective on a thin flexible magnetic disk and a single leaf spring so arranged with respect to these two arms that it has the three-fold function of (1) yieldably moving the arms together, (2) acting as a pivot allowing separating movement of the arms and the transducers carried by the arms and (3) acting as a pivot for the arms movable as an assembly with respect to a carriage support. It is contemplated that preferably each of the transducers may be mounted with respect to its swing arm by a gimbal spring formed from a sheet of flat spring material, with the gimbal springs being slightly deformed by the transducers bearing upon each other through the thickness of the thin flexible disk so that the gimbal springs hold the transducers in their proper pressure relationship with respect to the disk. It is contemplated also that the gimbal springs mounting the transducers shall be effective to absorb relatively high frequency movements of the transducers without corresponding movements of the arms and that the leaf spring shall be effective to absorb relatively low frequency movements of the transducers with corresponding movements of the arms.

BRIEF DESCRIPTION OF THE DRAWINGS

FIG. 1 is an isometric view of the transducer carriage assembly of the invention including a nominally flat leaf spring for mounting a pair of transducer carrying arms with respect to each other, a magnetic diskette being shown in the operative position in the assembly between these arms;

FIG. 3 is a side elevational view of the carriage assembly;

FIG. 4 is a side elevational view of one of the two arms of the carriage assembly and taken on line 4—4 of FIG. 2;

DESCRIPTION OF THE PREFERRED EMBODIMENT

Figure 5:
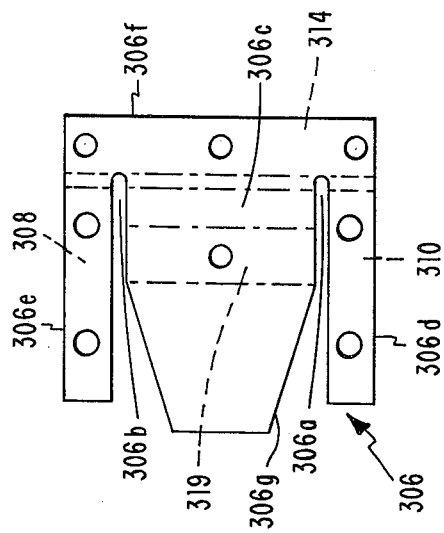
FIG. 5 is a plan view of the flat leaf spring.

The transducer carriage assembly 70V hereof may take the place of the carriage 70 disclosed in Castrodale et al U.S. Pat. No. 4,089,029 issued May 9, 1978 and may be used in the data storage apparatus disclosed in this patent. Carriage 70V includes a support 300 slideably disposed on guide rods 76V and 78V which correspond with the guide rods 76 and 78 of U.S. Pat. No. 4,089,029. The carriage assembly 70V is adapted to be used in connection with a magnetic disk assembly or diskette 18V which has a flexible magnetic disk 20V and corresponds with the disk assembly 18 of U.S. Pat. No. 4,089,029. As disclosed in said patent, the disk 20V is of a thin flexible material, such as polyethelene terephthalate of about 0.003 inch (0.076 mm) thickness. The disk 20V is rotatably disposed in a square jacket 22V of more rigid material. The guide rods 76V and 78V extend parallel with the plane of disk 20V so that the support 300 travels parallel with the plane of the disk. The disk is clamped at its center and is rotatably driven by the clamping means as is disclosed in U.S. Pat. No. 4,089,029. The assembly 70V includes a pair of transducers 150V and 152V which travel with the carriage 300 so that the transducers 150V and 152V move radially across and in contact with the opposite surfaces of the disk 20V.

The assembly 70V includes a pair of rigid metal swing arms 302 and 304 which are swingable apart by virtue of being mounted on a leaf spring 306 which in unstressed condition is flat. The spring 306 is bifurcated to have two outer legs 306d and 306e joined by a base portion 306f. The spring 306 in its unstressed condition is flat and has a pair of longitudinal slots 306a and 306b therein so that the spring 306 has a central leg 306c in addition to the two outer legs 306d and 306e joined by the transversely extending base portion 306f (see FIG. 5). The central leg 306c has a tapered end portion 306g as shown.

Figure 2:
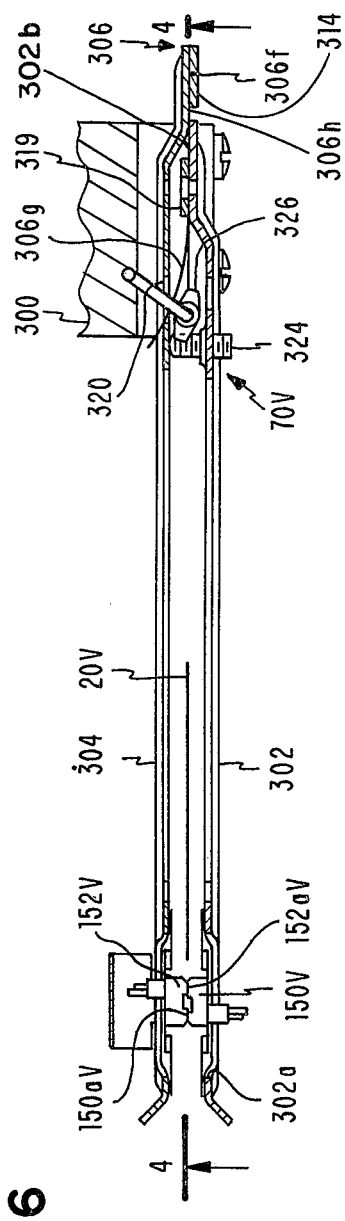
FIG. 2 is a longitudinal sectional view of the carriage assembly taken on line 2—2 of FIG. 1.

The outer legs 306d and 306e are fixed with respect to the support 300 by means of a pair of fastening plates 308 and 310 held in place by means of screws 312 and holding the legs 306d and 306e in flat face to face contact with flat surfaces 300a of the carriage 300. The legs 306d and 306e are thus positioned in the nominal plane of the disk 20V and in the plane of the transducer faces 152aV and 150aV that contact the disk 20V in the data transferring positions of the parts as shown in FIG. 2. The arm 304 is fixed with respect to the transversely extending base 306f of spring 306 by means of a plate 314 extending over the surface of the spring base 306f and fixed with respect to the arm 304 by means of screws 316 extending through the plate 314 and spring base 306f and thus holding the spring base 306f in flat face to face contact with the flat surface 304a of arm 304. The arm 302 is fixed with respect to the central log 306c of the spring 306 by means of spot welds 318 extending through the arm 302 and a plate 319 on the opposite face of the leaf spring 306. The plate 319 holds the central spring leg 306c in flat face to face contact with the inner flat surface 302b of the arm 302. The tapered end 306g of the spring 306 extends through an opening 320 provided in the arm 304 so that the spring abuts against an edge 322 of this opening.

The tapered portion 306g of the spring 306, which is located between the edge 322 and the plate 319, functions to provide a force on the arms 302 and 304 yieldably pulling these arms together. This is due to the spring action of the spring portion 306g acting between the edge 322 and the plate 319 and since the spring 306 when unstressed is flat. The plate 314 is separated from the adjacent end of the arm 302 by a portion 306h of leg 306c, and portion 306h acts as a pivot to allow separating movement of the arms 302 and 304 with respect to each other. The spring portion 306h is flat, unflexed and in the plane of the disk 20V when the transducers 150V and 152V are in contact with the disk 20V and constitutes a hinge connecting the arms 302 and 304 together.

The plate 314 has a separation with respect to the plates 308 and 310 providing intervening portions 306j and 306k of legs 306c and 306d. Assuming that the arms 302 and 304 under certain conditions have no movement with respect to each other and act as a unit, the assembly of these two arms 302 and 304 may swing with respect to the support 300 with a flexing of the spring portions 306j and 306k. The spring portions 306j and 306k are flat, unflexed and in the plane of the disk 20V when the transducers 150V and 152V are in contact with the disk 20V and the disk 20V is stationary.

A set screw 324 extends through the arm 302 and may abut the arm 304 so as to limit the swinging movement of the arms 302 and 304 together under the influence of the central spring portion 306g. Toggles 326 are disposed between the arms 302 and 304 for the purpose of forcing the arms 302 and 304 apart against the action of the spring portion 306g. The toggles 326 are fixed on a shaft 328 which is journaled between the support 300 and the plates 308 and 310 so that the toggles 326 may be rotated. The shaft 328 has an arm portion 328a outside of the support 300, and the arm portion 328a is adapted to be acted on by a lever extension 142aV which corresponds to the lever extension 142a of U.S. Pat. No. 4,089,029. The lever extension 142aV may be moved in direction A for the purpose of acting on the shaft extension 328a so as to rotate the shaft 328 and thus rotate the toggles 326 so that the toggles wedge between the arms 302 and 304 and swing the arms 302 and 304 apart with yielding of the spring portion 306h. The lever extension 142aV may be operated by an electromagnet such as is shown in U.S. Pat. No. 4,089,029 or by any other suitable motor means.

Figure 6:
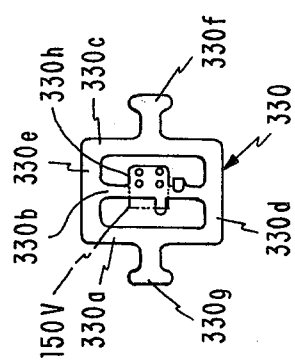
FIG. 6 is a plan view of a gimbal spring used in the assembly for carrying each of the transducers with respect to its respective arm.

The arm 302 is provided with an opening 302a through it adjacent its distal end remote from the support 300 (see FIGS. 1 and 3). The transducer 150V is fixed with respect to the arm 302 by means of a gimbal 330 which extends across the opening 302a. The gimbal 330 constitutes a sheet of resilient metal flat when unstressed and formed generally in the shape of a figure eight and having parallel legs 330a, 330b and 330c, end legs 330d and 330e and end tabs 330f and 330g located centrally of the legs 330a and 330c and extending off of these two legs (see FIG. 6). The gimbal 330 is fixed with respect to the arm 302 by spot welds 332. The legs 330b is provided with an enlargement 330h, and the transducer 150V is fixed to the leg 330b and enlargement 330h by any suitable bonding. The transducer 152V is fixed with respect to the arm 304 in the same manner as the transducer 150V is fixed with resepct to the arm 302, using a second gimbal 330.

In operation, the arms 302 and 304 may be assumed initially to be held apart by the toggles 326. The lever extension 142aV has been moved in direction A so as to move against the shaft extension 328a and rotate the shaft 328 through nearly 90° about its journaling between the support 300 and the plates 308 and 310. This rotation of the shaft 328 has rotated the toggles 326 accordingly so that they have swung the arms 302 and 304 apart about the spring portion 306h as a pivot between the arms and against the spring flexing action of the tapered spring portion 306g. The transducers 152V and 150V are fixed with respect to the arms by means of the gimbals 330, and the transducers 152V and 150V have thus been moved apart. The magnetic disk assembly 18V is then moved in direction B into its position between the arms 302 and 304 as shown in FIG. 1. The radially extending slots 28V in the two thicknesses of the jacket 22V are then in position between the swing arms 302 and 304 so that the transducers 152V and 150V may be applied onto the two surfaces of the disk 20V.

The lever extension 142aV is then moved back into its original position, allowing the shaft 328 and the toggles 326 to move back into their original positions. The arms 302 and 304 then swing together under the action of the spring portion 306g which is clamped flat against the inside surface 302b of the arm 302 by the plate 319 and, in tending to return to its flat unstressed disposition, bears against the edge 322 and thus tends to move the arm 304 toward the arm 302 to swing the arms together. The spring portion 306h between the arm 302 and the plate 314 functions as a pivot to allow this swinging movement of the arms 304 and 302 toward each other. The setscrew 324 moves into contact with the arm 304 and holds the arms 302 and 304 to their positions of closest approachment under action by the spring portion 306g. With this approaching swinging movement of the arms 302 and 304, the arms 302 and 304 embrace the disk 20V and the transducers 150V and 152V move together and in register except for the existence of the disk 20V between them so that the active transducer faces 150aV and 152aV bear on the opposite surfaces of the disk 20V for a data transferring action between the transducers and disk. The gimbals 330 are flexed somewhat out of flatness so that the gimbals 330 hold the transducers 152V and 150V in somewhat forceful contact with the disk 20V. With the setscrew 324 in contact with the arm 304, the arms 302 and 304 are in effect fixed with respect to each other so that they may function as a unit or an assembly; and swinging movement of the arms 302 and 304 and of the transducers 150V and 152V may take place with respect to the carriage 300 with flexing action of the spring portions 306j and 306k.

The magnetic disk 20V due to its flexibility undulates between the transducers 150V and 152V. Therefore, in order for the transducers to remain in contact with the disk 20V with these undulations, the transducers do and must have corresponding movements. These transducer movements have three components, namely, translatory movements in directions perpendicular to the nominal plane of the disk 20V, pitching movements about axes that constitute radii of the disk 20V and rolling movements about axes perpendicular to the disk radii. These undulations are at high frequencies and low frequencies. The low frequency undulations take place once or twice, for example, for each revolution of the disk 20V and cause translatory movements of the transducers 150V and 152V that may be accommodated by some flexing of the gimbals 330 but are principally accommodated by movements of the arms 302 and 304 sidewardly as a unit with the transducers moving in directions parallel with the axes of the disk 20V and remaining in face to face contact with the disk and with the spring portions 306j and 306k flexing to allow such movements of the arms 302 and 304 as a unit. These low frequency undulations may be caused by inherent warping of the disk due to its manufacture from an elongate web of base material or due to uneven air flow between the disk 20V and the inner surfaces of the jacket 22V. The high frequency undulations occur much more frequently during disk rotation, such as 20 to 40 times for each revolution of the disk 20V, and may be due to much the same causes as the low frequency undulations. At these high frequencies, corresponding pitching, rolling and translating motions of the transducers occur, and the gimbals 330 flex to allow these high frequency movements of the transducers which remain in face to face contact with the disk, with no corresponding movements of the arms 302 and 304 particularly because of the relatively high inertia of the arms.

Depending upon the amplitude of the undulations at the low frequency, these undulations may be accommodated by the arms 302 and 304 moving as a unit or by the gimbals 330 depending upon the amplitudes of the undulations. Whether the arms or the gimbals, or both, accommodate these low frequency undulations is of course determined by the masses of the arms 302 and 304, the distance the transducers 150V and 152V are spaced from the pivot portions 306j and 306k of the spring 306, the masses of the transducers 150V and 152V and the relative spring strengths of the gimbals 330 and spring 306.

Advantageously, the single leaf spring 306 performs the following different functions:

a. The central portion 306c of the spring 306, in being clamped flat against the inside surface 302b of the arm 302 and bent out of its flat unstressed disposition by bearing on the edge 322 of the arm 304, provides the closing force for the arms 302 and 304 to move the setscrew 324 into contact with the arm 304.

b. The spring portion 306h between the plate 314 and the adjacent end of the arm 302 acts as a pivot to allow swinging movement of the arms 302 and 304 with respect to each other and effectively ties the arm 302 and 304 together.

c. The spring portions 306j and 306k between the plate 314 and the plates 308 and 310 function to allow the swinging movement of the arms 304 and 302 as a unit with respect to the carriage 300. The setscrew 324 under these conditions remains in contact with the arm 304 so that the arms 302 and 304 function as a unit and swing together.

d. Since the outer legs 306d and 306e, by means of which the arms 302 and 304 are attached to the carriage 300, are spaced; the assembly of the arms 302 and 304 and the transducers 150V and 152V is held from movement from horizontal, assuming that these arms 302 and 304 initially extend horizontally and that the plane of the disk 20V is vertical.

Advantageously, therefore, the transducer carriage assembly accommodates both low frequency and high frequency undulations of the flexible disk 20V, and this is accomplished with the transducers being held thereby in uniform pressure and contact with the disk 20V. This uniform application of the transducers to the disk 20V is attained particularly since the arms 302 and 304 are at a fixed distance apart (so held by the set screw 324 and spring portion 306g in the illustrated embodiment) and since the spring portions 306j and 306k are in their unstressed flat dispositions when the transducers are in contact with the disk 20V in its nominal plane. When the disk 20V is rotating, the undulations are of an insignificant amplitude with respect to the spring portions 306j and 306k, since the spring portions are located quite some distance away from the transducers 150V and 152V. Thus, the spring portions 306j and 306k are not flexed substantially during the disk undulations and do not act to apply more force on one of the transducers than on the other that would be caused by these spring portions if appreciably flexed.

The arms 302 and 304 being held at a fixed distance apart, with the set screw 324 being in contact with the arm 304 due to the action of the spring portion 306g, thus function as a kind of course aligner for the transducers 150V and 152V allowing the transducers to translate in directions normal to the nominal plane of the disk 20V with the low frequency undulations. Since the arms 302 and 304 have substantial mass, they are not appreciably effective for the high frequency undulations of the disk; however, the gimbals 330 in themselves, being of spring material, flex and bend and thus function as a sort of fine aligner for the transducers for absorbing fine or high frequency undulations of the disk either normal to the nominal plane of the disk or in such directions to produce pitching or rolling motions of the transducers. The gimbals 330 function satisfactorily in this respect, without the necessity of using auxiliary load arms or beams and are self-loading. Their use results in a minimum number of parts and a minimum cost of the transducer carriage assembly, considering the various requirements of the system.

It may be noted that the spring portions 306j and 306k about which the arms 302 and 304 move when functioning as a unit, are located nearly as remotely as possible from the transducers 152V and 150V and are in the plane of the disk 20V (see FIG. 2 in particular). This arrangement yields an advantage in better and consistent track registration as a function of the deflection angle of the arms 302 and 304 from their normal dispositions parallel with the nominal plane of the disk 20V as the disk wobbles and has runout, in comparison with many prior designs of carriage assemblies.

Having thus described the invention, what is claimed as new, and desired secured by Letters Patent is:

1. A transducer-carriage assembly for use with a rotatable flexible disk having high frequency undulations and low frequency undulations as the disk rotates and comprising:

a pair of transducers,
a pair of rigid arms adapted to embrace the disk,
spring means for anchoring each of said transducers with respect to one of said arms adjacent an end of the arm for holding the transducers in register opposite each other on and in effective contact with opposite sides of the disk and effective to absorb the high frequency undulations of the disk as it rotates, second spring means comprising a single leaf spring element connected to and between said arms adjacent their other ends and including a leaf spring portion that is fixed in face to face contact with one of said arms and extends through the other of said arms for moving said arms together so that they function as a unit and for moving said transducers into effective contact with the disk, a carriage, and means for hingedly mounting said arms with respect to said carriage so that said arms may swing as a unit to accommodate low frequency undulations of the disk as it rotates.

2. A transducer-carriage assembly comprising:

first and second swing arms, a first transducer carried adjacent a distal end of said first swing arm, a support, a bifurcated leaf spring which is flat in the unstressed condition having a pair of spaced outer legs extending toward said swing arm distal end, a central leg disposed between said outer legs and a base portion joining said spaced legs together, means fixing said outer legs in flat face to face contact with said support, means joining said base portion of said leaf spring in face to face contact with the other end of said first swing arm so that said outer legs effectively hinge said first swing arm and transducer with respect to said support, a second transducer carried by said second swing arm adjacent a distal end of the arm and adapted to be in register with said first transducer, and means joining said second swing arm adjacent its other end in flat face to face contact with said central leg of said leaf spring with said central leg of said leaf spring extending from its place of joining with said second swing arm to said first named swing arm and being stressed thereby out of its flat unstressed condition, so that said central leg effectively hinges said swing arms together whereby they and said transducers may swing toward and away from each other.

* * * * *